United States Patent [19]

Brown

[11] 4,373,877
[45] Feb. 15, 1983

[54] PUMP WITH ROTATABLE RESERVOIR CASING AND INDEX MEANS

[75] Inventor: Arthur K. Brown, South Bend, Ind.

[73] Assignee: The Bendix Corporation, Southfield, Mich.

[21] Appl. No.: 186,940

[22] Filed: Sep. 15, 1980

[51] Int. Cl.³ .................... F04C 15/00; B65D 45/04; F16B 2/20
[52] U.S. Cl. ........................ 418/2; 418/39; 418/270; 292/256; 403/4; 403/27
[58] Field of Search ............. 418/2, 39, 70, 181, 418/270; 403/4, 27, 338; 417/238; 292/212, 251, 256

[56] References Cited

U.S. PATENT DOCUMENTS

| | | | |
|---|---|---|---|
| 2,578,476 | 12/1951 | Hollinger | 403/27 |
| 2,718,423 | 9/1955 | Eaddy | 292/256 |
| 3,347,572 | 10/1967 | Pfaff, Jr. et al. | 403/27 |
| 3,632,238 | 1/1972 | Searle | 418/39 |

*Primary Examiner*—John J. Vrablik
*Attorney, Agent, or Firm*—Paul David Schoenle; Ken C. Decker

[57] ABSTRACT

A power steering pump includes a pump housing (12) and a chambered sheet metal casing (14) around the pump housing. The pump housing and casing cooperate to define a fluid reservoir (22) for the power steering system. The pump housing defines a cylindrical outer surface (30) and the casing defines a circular opening (24) through which the pump housing extends into the casing chamber. An annular groove (32) circumscribes the pump housing cylindrical surface and receives an O-ring seal (34). An annular rim (36) is defined by the casing around the opening into the chamber. The annular rim (36) extends parallel to and closely adjacent the cylindrical outer surface (30) of the pump housing and cooperates with the O-ring (34) to effect a fluid-tight seal between the pump housing and casing. The casing is rotatable relative to the pump housing so that the fluid reservoir is adjustably positionable rotatably relative to the pump housing. The casing defines a radially-extending lip (42) which circumscribes the casing opening (24). Fasteners (46, 72) carried by the pump housing (12) engage the casing lip (42) to hold the casing and pump housing together while allowing adjustable rotational positioning of the fluid reservoir relative to the pump housing.

1 Claim, 6 Drawing Figures

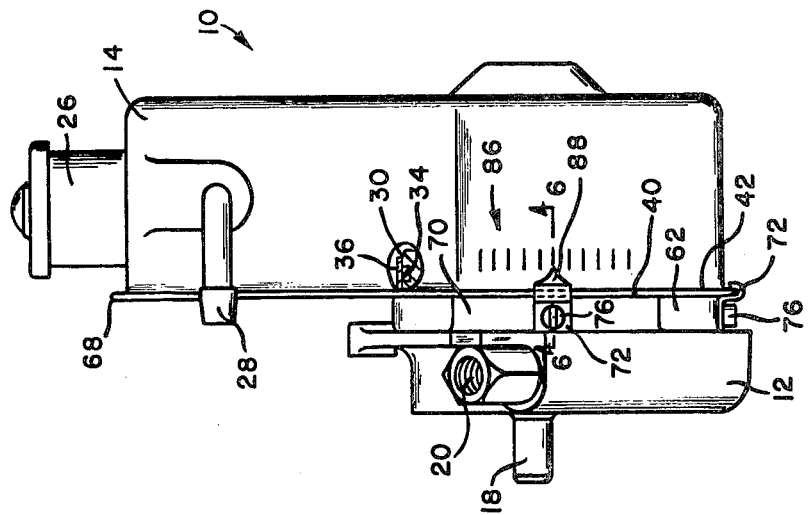
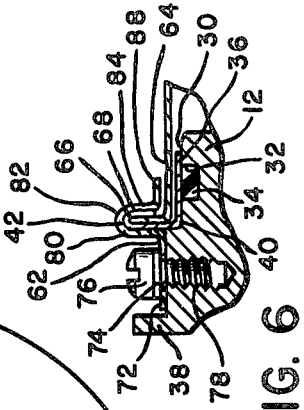
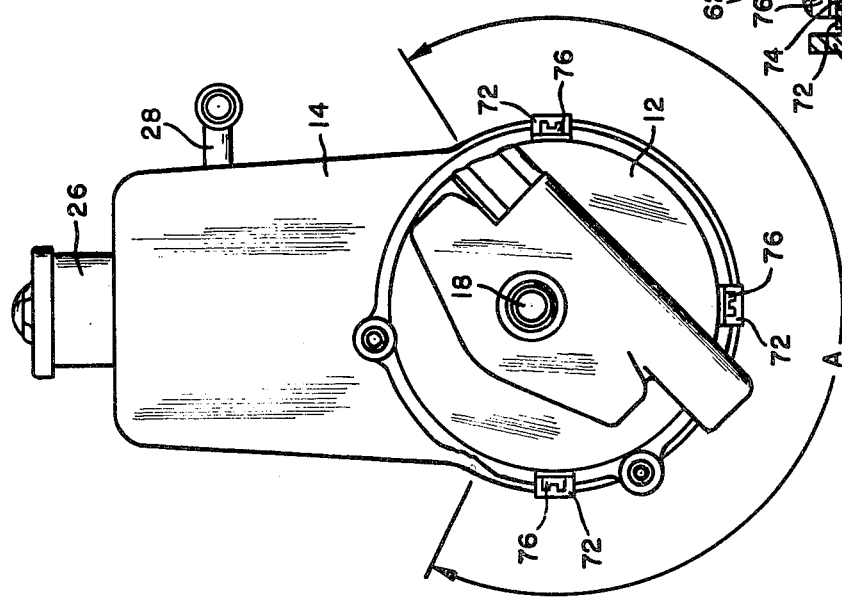

PUMP WITH ROTATABLE RESERVOIR CASING AND INDEX MEANS

This invention relates to an improvement in power steering pumps. More particularly, the invention relates to a power steering pump having an improved housing which facilitates mounting of the pump to a variety of automotive vehicle engines.

Power steering pumps of the type to which the invention pertains include a pump housing having a fluid pumping device therein. A power input shaft is journaled in the pump housing and is connected to the pumping device. The power input shaft is drivingly connected to a vehicle engine so that the pump is driven when the engine is operated.

The power steering pump further includes a sheet metal casing which defines a chamber therein. An aperture is defined by the casing and a portion of the pump housing extends through the aperture and into the casing chamber. A sealing member forms a fluid-tight seal between the pump housing and the casing. The casing and the pump housing cooperate to define a fluid reservoir for the power steering system. An inlet of the pump within the casing communicates with the fluid reservoir. A pump outlet communicates with an outlet fitting carried by the pump housing external of the casing so that the power steering pump may be connected to supply pressure fluid to a fluid motor or steering gear. The casing also has an inlet fitting through which fluid returned from the fluid motor may enter the reservoir. A filler opening on the casing is provided so that fluid may be added to the power steering system.

Currently available power steering pumps of the type described above have the casing and pump housing fastened together in a predetermined relationship to one another. Generally, the casing is fastened to the pump housing by cap screws which pass through apertures in the sheet metal casing to engage threaded bores in the pump housing. Because the power steering pump is carried on the vehicle engine by a bracket which engages with the pump housing and which has little or no freedom of movement with respect to the engine, the position of the casing with respect to the engine is not adjustable to any significant extent. The casing, and the fluid reservoir defined thereby, comprise a substantial part of the volume of the power steering pump. Consequently, when other accessories such as refrigerant or air compressors or an alternator are added to the engine, conflicts may arise between the reservoir of the power steering pump and these other accessories. Additionally, it is desirable to use a single design of engine in a variety of vehicles. As a result, exhaust manifolds, steering and suspension parts, and other vehicle components interfere with the power steering pump and with the other engine accessories so that a variety of power steering pump brackets must be provided in order to permit a particular design of engine to be accommodated in a variety of vehicles. In light of these considerations and others, it is common to manufacture right-hand and left-hand versions of a particular casing design, or to manufacture a variety of casings having different designs, all of which can be assembled with a single design of pump housing. These components are used to assemble a variety of power steering pumps which differ from one another only in the configuration and placement of their fluid reservoirs.

A further consideration with current power steering pumps is that the casing is attached to the pump housing by cap screws which pass through holes in the casing. These holes provide a leakage path through which fluid may leak from the reservoir. Seals must be provided at these cap screws.

Therefore, it is desirable to provide a power steering pump which has its reservoir adjustably positionable relative to the pump housing and in which the number of potential leakage paths from the reservoir is reduced.

The invention provides a power steering pump, the reservoir of which is adjustably positionable relative to the pump housing. In order to provide for adjustment of the casing relative to the pump housing, a circumferentially extending lip is provided on the casing. The lip extends radially outwardly and circumscribes at least a part of the casing aperture through which the pump housing extends. Fasteners are carried by the pump housing and engage the lip to hold the pump housing and casing together. When the fasteners are loose, the casing may be rotated relative to the pump housing. By tightening the fasteners, a selected positional relationship between the pump housing and casing may be maintained. Additionally, a power steering pump according to the invention does not employ cap screws passing through apertures in the casing to hold the pump together, so the leakage paths presented by these cap screws of prior pumps are eliminated.

One embodiment of the invention provides a multiplicity of indicia defined on the casing and an index defined on the pump housing. Through the use of these indicia and index, the desired positional relationship of the casing and pump housing can be established prior to mounting the power steering pump to an engine.

It is an object of the invention to provide a power steering pump having its fluid reservoir adjustably positionable relative to the pump housing.

A further object of the invention is to eliminate the leakage paths presented in prior power steering pumps by the cap screws which hold the reservoir to the pump housing.

The advantages offered by the invention are mainly that a multiplicity of casings need not be provided in order to adapt a particular pump to various applications; rotation of the reservoir relative to the pump housing provides for installation of the power steering pump on either the left-hand or right-hand side of a vehicle engine and also allows positioning of the reservoir to provide clearance for other engine accessories.

Three ways of carrying out the invention are described in detail below with reference to the drawings which illustrate these three specific embodiments, in which:

FIG. 4 is a side view partly in cross-section of a power steering pump and illustrates yet another embodiment of the invention;

FIG. 5 is a front view of the power power steering pump illustrated in FIG. 4 with parts broken away for clarity of illustration; and FIG. 6 is an enlarged fragmentary cross-sectional view taken along the line 6—6 of FIG. 4.

Figure 1:
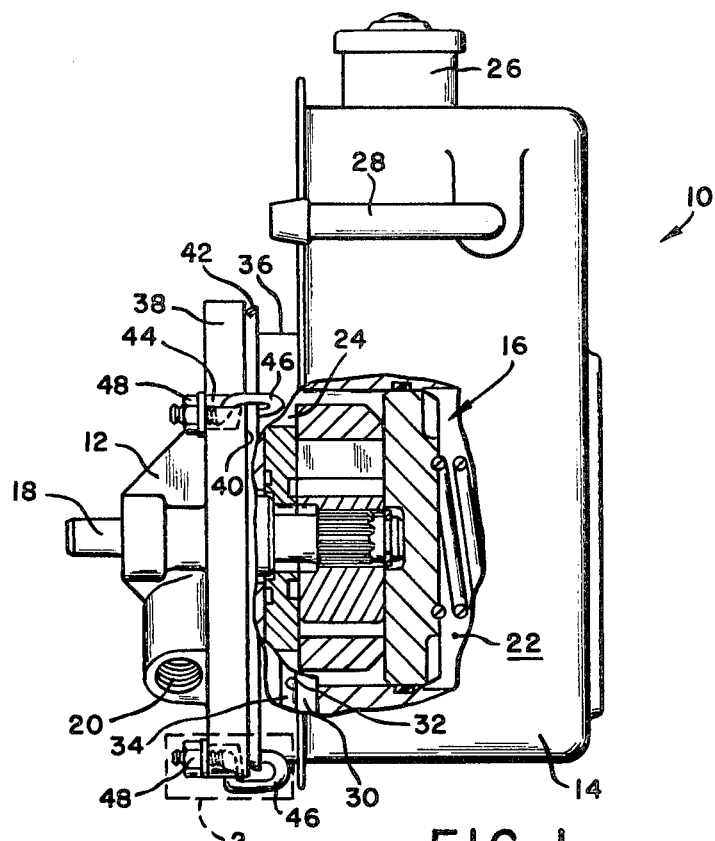
FIG. 1 is a side view partly in cross-section of a power steering pump in accordance with the invention.

The drawings show a power steering pump 10 having a pump housing 12 and a sheet metal casing 14. Pump housing 12 is a casting and houses a vane-type pump device generally referenced by the numeral 16. Housing 12 also journals a power-input shaft 18 and defines a flowpath from a pump inlet (not shown) to an outlet 20. When input shaft 18 is rotated, pump device 16 moves fluid from the pump inlet to the outlet 20. Because pump device 16 comprises no part of this invention and because vane-type pumps are well known in the power steering art, the construction features of pump device 16 will not be explained in further detail. It is to be understood, however, that the invention is not limited to the use of a vane-type pump device and that pump housing 12 could house a pump of another type. For example, pump housing 12 could house an axial or radial piston pump device, or a gear-rotor type of pump device.

Casing 14 is constructed of sheet metal and defines a chamber 22 therewith. Casing 14 defines a circular opening 24 and pump housing 12 passes through opening 24 and is received in chamber 22. Casing 14 and pump housing 12 cooperate to define a fluid reservoir for the power steering pump. A filler opening 26 is provided at the top of casing 14 through which fluid may be introduced into chamber 22. Casing 14 is also provided with a return opening 28 through which fluid is returned to reservoir chamber 22 after having been pumped through an external hydraulic system (not shown) by pump 16. The inlet of pump 16 communicates with chamber 22.

In order to obtain a fluid-tight joint between pump housing 12 and casing 14, the housing 12 defines an axially-extending, cylindrical outer surface 30 and a circumferentially-extending groove 32 circumscribes surface 30. A resilient annular sealing member 34 of the O-ring type is received in groove 32. Casing 14 includes an axially-extending annular rim 36 which extends substantially parallel to and adjacent the surface 30. Sealing member 34 engages rim 36 to provide a fluid-tight seal between the casing 14 and the pump housing 12. Because opening 24 and rim 36 are circular and surface 30 is cylindrical, casing 14 is rotatable relative to pump housing 12.

Pump housing 12 defines a radially-extending flange 38 which cooperates with the cylindrical surface 30 to define a shoulder 40. A lip 42 extends radially outwardly from rim 36 and engages shoulder 40. Lip 42 is curled and terminates in an end edge which projects away from flange 38 and toward the casing 14. The flange 38 is cut out at 44 to receive a J-shaped fastener 46. The right end of fastener 46 hooks into the curled lip 42 and the left end of the fastener 46 is threaded and carries a washer and nut 48.

Figure 2:
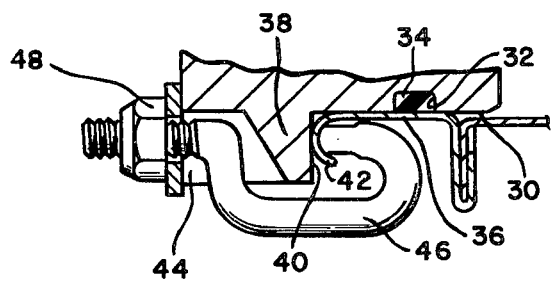
FIG. 2 is a fragmentary cross-sectional view of an encircled portion of the pump illustrated by FIG. 1 and on an enlarged scale.

Turning to FIG. 2, it will be seen that the fastener 46 is made from round wire or bar stock and is generally J-shaped. Fastener 46 is bent so that its threaded left end, which carries nut and washer 48, is aligned axially with the portion of the fastener which engages lip 42. In order to prevent fastener 46 from turning when nut 48 is tightened or loosened, the cutout 44 in flange 38 receives a portion of the fastener. Only a slight circumferential clearance is defined between the cutout 44 and the portion of fastener 46 which is received therein so that the fastener 46 resists being rotated. Lip 42 is received between shoulder 40 and the end of fastener 46 so that the shoulder 40 defines the leftward position of lip 42. Consequently, the axial position of casing 14 relative to pump housing 12 is defined by the engagement of lip 42 with shoulder 40 because the fastener 46 retains lip 42 against the shoulder 40 so that the casing cannot move axially to the right.

Figure 3:
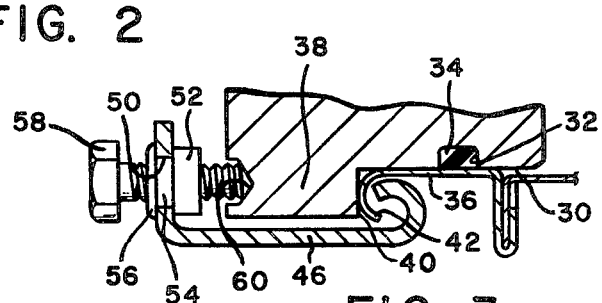
FIG. 3 is a fragmentary cross-sectional view similar to FIG. 2 and illustrates an alternative embodiment of our invention.

FIG. 3 illustrates an alternative embodiment of the invention which is substantially the same as the embodiment illustrated by FIGS. 1 and 2, with the exception of features to be explained. Consequently, the same reference numerals are used throughout to identify features which are analagous in function or structure.

In the embodiment illustrated by FIG. 3, the fastener 46 is a stamped part made from sheet material. Additionally, the fastener 46 is stamped so that the portion spanning flange 38 extends circumferentially around the perimeter of the flange. Consequently, the portion of fastener 46 which spans flange 38 is arcuate in cross-section rather than having a circular cross-section as does the fastener illustrated in FIGS. 1 and 2. The right end of fastener 46 hooks into engagement with lip 42 and the left end is bent and extends radially inwardly toward the center of pump housing 12. The left end of fastener 46 defines an aperture 50 and a nut 52 includes a portion 54 which extends through aperture 50 and which is swaged at 56 to secure the nut to fastener 46. A cap screw 58 is threaded into nut 52 and the right end of the cap screw enters a recess 60 defined by flange 38.

Fastener 46 resists being rotated when cap screw 60 is tightened or loosened because the right end of cap screw 58, which is received in recess 60, and the right end of fastener 46, which engages with lip 42, define an axis about which the fastener 46 may rock. Because the fastener extends for a short distance circumferentially around the flange 38, rocking of the fastener causes one of the circumferential edges of the fastener to contact flange 38 and to result in a moment which resists further rocking of the fastener.

FIGS. 4–6 illustrate yet another embodiment of the invention. In the embodiment illustrated in FIG. 4, casing 14 includes an axially-extending annular rim 36, viewing FIG. 6, which extends into the chamber 22 substantially parallel to and adjacent surface 30. Rim 36 engages a sealing member 34 to provide a fluid-tight joint between the pump housing 12 and casing 14. Additionally, the housing 12 defines an axially-projecting, circumferentially-extending ledge 62 which extends parallel to rim 36 and away from casing 14. The ledge 62 and surface 30 cooperate to define a shoulder 40 on pump housing 12. Viewing FIG. 6, it can be seen that casing 14 includes a first stamped part 64 and a second stamped part 66 which are joined together at a welded seam 68. The part 66 defines rim 36. Where the parts 64 and 66 are crimped together and welded to form seam 68, the casing 14 defines a lip 42 which extends radially outwardly. The lip 42 circumscribes the opening 24 in casing 14 and defines a substantially uniform spaced relationship with the opening 24 and rim 36 over a portion of the circumference. A fastener 72 is carried on the ledge 62. Fastener 72 defines an aperture 74 and is connected to pump housing 12 by a machine screw 76 which passes through aperture 74 and threadably engages a bore 78 in the pump housing 12. Fastener 72 defines a first portion 80 which extends radially outwardly from the ledge 62 of pump housing 12 adjacent the left edge of lip 42. A second portion 82 of fastener 72 extends axially across the outer end of lip 42 and the fastener terminates in a third portion 84 which extends radially inwardly from portion 82 towards the center of the casing 14 and adjacent to the right edge of lip 42. These three portions 80, 82 and 84 of fastener 72 define a U-shape in cross-section. The third portion 84 of fastener 72 cooperates with lip 42 to prevent rightward axial separation of the casing 14 from pump housing 12, viewing FIGS. 4 and 6.

Turning to FIG. 5, the lip 42 extends around the perimeter of casing 14 and is defined by the seam between parts 64 and 66 of the casing. Within the arc delimited by the arrow A, the seam 68 defines a substantially constant radius with respect to the opening 24. Consequently, the lip 42 defined by seam 68 extends circumferentially within the arc A and the fasteners 72 carried by pump housing 12 may engage with lip 42 anywhere within arc A. The location of bores 78 on ledge 62 and of fasteners 72 on pump housing 12 is such that casing 14 may be rotated about 30° in either direction relative to pump housing 12 from its position illustrated in FIG. 5. Thus, casing 14 has a total of about 60° of rotational freedom with respect to pump housing 12.

Viewing FIG. 4, the casing 14 defines a plurality of circumferentially-arranged indicia 86. Fastener 72 includes an index 88 which may be aligned with a selected one of the indicia 86 to select a predetermined positional relationship of casing 14 to pump housing 12.

The embodiments of the invention illustrated in FIGS. 1, 2, and 3 provide for complete rotational freedom of casing 14 with respect to pump housing 12. When nut 48 or cap screw 58 is loosened, as is illustrated in FIG. 3, the lip 42 may slide between the shoulder 40 on pump housing 12 and the right ends of the fasteners 46. Rim 36 slides around cylindrical surface 30 which is defined by pump housing 12. The sealing member 34 maintains a fluid-tight sealing integrity between the pump housing and casing 14. Fasteners 46 do not rotate with casing 14 because they are received in cutouts 44 defined in flange 38, or because they carry cap screws 58 which are received in recesses 60 defined in flange 38. Tightening of the nuts 48 or of cap screws 58 of fasteners 46 results in the fasteners clamping lip 42 securely into position against the shoulder 40.

In the embodiment of the invention illustrated by FIGS. 4, 5 and 6, the machine screws 76 may be loosened to allow lip 42 to slide through the U-shaped part of fastener 72. When the machine screws are tightened, the portion 82 of each fastener bears against the radially outer edge of lip 42 so that the casing is prevented from rotational movement relative to the pump housing 12.

The invention provides a power steering pump having a fluid reservoir which is rotatably positionable relative to the pump housing portion of the power steering pump. Those skilled in the art will recognize that this feature provides a desirable flexibility of application for a pump according to the invention which is not possessed by prior pumps. Because the casing portion of the power steering pump is rotatable relative to the pump housing portion, the necessity to manufacture right-hand and left-hand versions of the casing is eliminated. Furthermore, because there are no apertures in the casing to receive cap screws to hold the casing to the pump housing, the leakage paths presented by these apertures of prior pumps are eliminated.

I claim:

1. In a fluid pump of the type having a body including:
 a casing portion defining a fluid reservoir therein and defining a circular opening leading to said reservoir;
 a pump housing portion rotatably received in said reservoir and closing said opening;
 means for effecting a fluid-tight seal between said body portions; and
 means for connecting said body portions; characterized in that said casing portion includes a lip circumscribing at least a part of said opening, said connecting means including a clip having a first part which is U-shaped in cross-section and receiving said lip and a second part extending from said first part, said second part cooperating with said pump housing portion to maintain a selected relative rotational position between said body portions, said casing portion defines a plurality of circumferentially-arranged indicia and said connecting means defines an index so that said selected relative rotational position of said body portions is defined by aligning said index relative said indicia, and said index is defined by said U-shaped first part.

* * * * *